No. 894,063. PATENTED JULY 21, 1908.
A. T. SALENIUS.
SPRING BEARING.
APPLICATION FILED APR. 17, 1906.

Witnesses:
W. P. Burke

Inventor:
Anders Thorbjörn Salenius

UNITED STATES PATENT OFFICE.

ANDERS THORBJÖRN SALENIUS, OF STOCKHOLM, SWEDEN.

SPRING-BEARING.

No. 894,063.  Specification of Letters Patent.  Patented July 21, 1908.

Application filed April 17, 1906. Serial No. 312,195.

*To all whom it may concern:*

Be it known that I, ANDERS THORBJÖRN SALENIUS, a subject of the King of Sweden, and resident of Handtverkaregatan 38 and 40, Stockholm, in the Kingdom of Sweden, engineer, have invented certain new and useful Improvements in Spring-Bearings, of which the following is a specification, reference being made to the accompanying drawing.

The present invention relates to such spring bearings (especially those intended for smaller-sized centrifugal separators), in which the centralization of the shaft is obtained by means of flat springs which rest on the sleeve of the bearing and on supports surrounding the same, and which springs are, directly or indirectly, fastened on the machine to which the bearing belongs.

On the accompanying drawing there is shown as an example a bearing especially intended for smaller-sized centrifugal machines and constructed in accordance with this invention.

Figure 1:
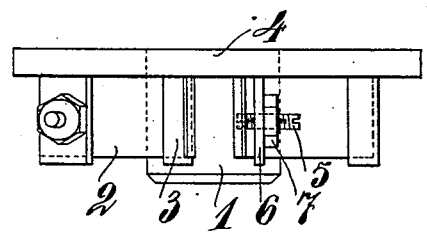
Figure 2:
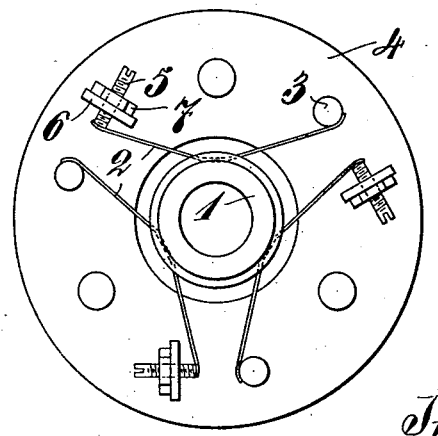

In Figure 1 this bearing is shown as seen from the side, and in Fig. 2 in plan, with the under side turned upwards.

The sleeve 1 of the bearing is kept in position by flat springs 2, which rest on the outside of the said sleeve, the outside being arranged in some suitable way, so that the sleeve is retained between the springs. It is suitable to use three springs, arranged at a distance of 120° from each other. In the form of construction shown, each of the springs 2 rests with one of its ends on a pin 3, around which the end of the spring is bent somewhat. The pins 3 project downwards from a ring-shaped plate 4, which surrounds the bearing and is fastened to the frame of the machine by means of screws. The other end of every spring rests on the one end of a screw 5, which is mounted in a fastening 6, projecting downwards from the ring 4. On every screw there is a locking nut 7.

By turning the screws 5 in the one direction or the other, the tension in the springs can, as it is easy to see, be changed, so that a suitable tension is obtained.

Having now described my invention, what I claim as new and desire to secure by Letters Patent is:

In a spring bearing the combination with a supporting plate having depending pairs of lugs thereon, a screw passing transversely through one lug of each pair and a flat spring supported by each pair of lugs, one end of the spring bearing against one lug and the other against the screw carried by the other lug.

In witness whereof I have hereunto set my hand in presence of two witnesses.

ANDERS THORBJÖRN SALENIUS.

Witnesses:
HJ. FETTERSTRÖM,
H. B. OHLSSON.